G. E. ELIA.
APPARATUS FOR DETECTING AND INDICATING THE PRESENCE OF SUBMARINE BOATS.
APPLICATION FILED JUNE 26, 1917.
1,430,162.
Patented Sept. 26, 1922.
3 SHEETS—SHEET 1.
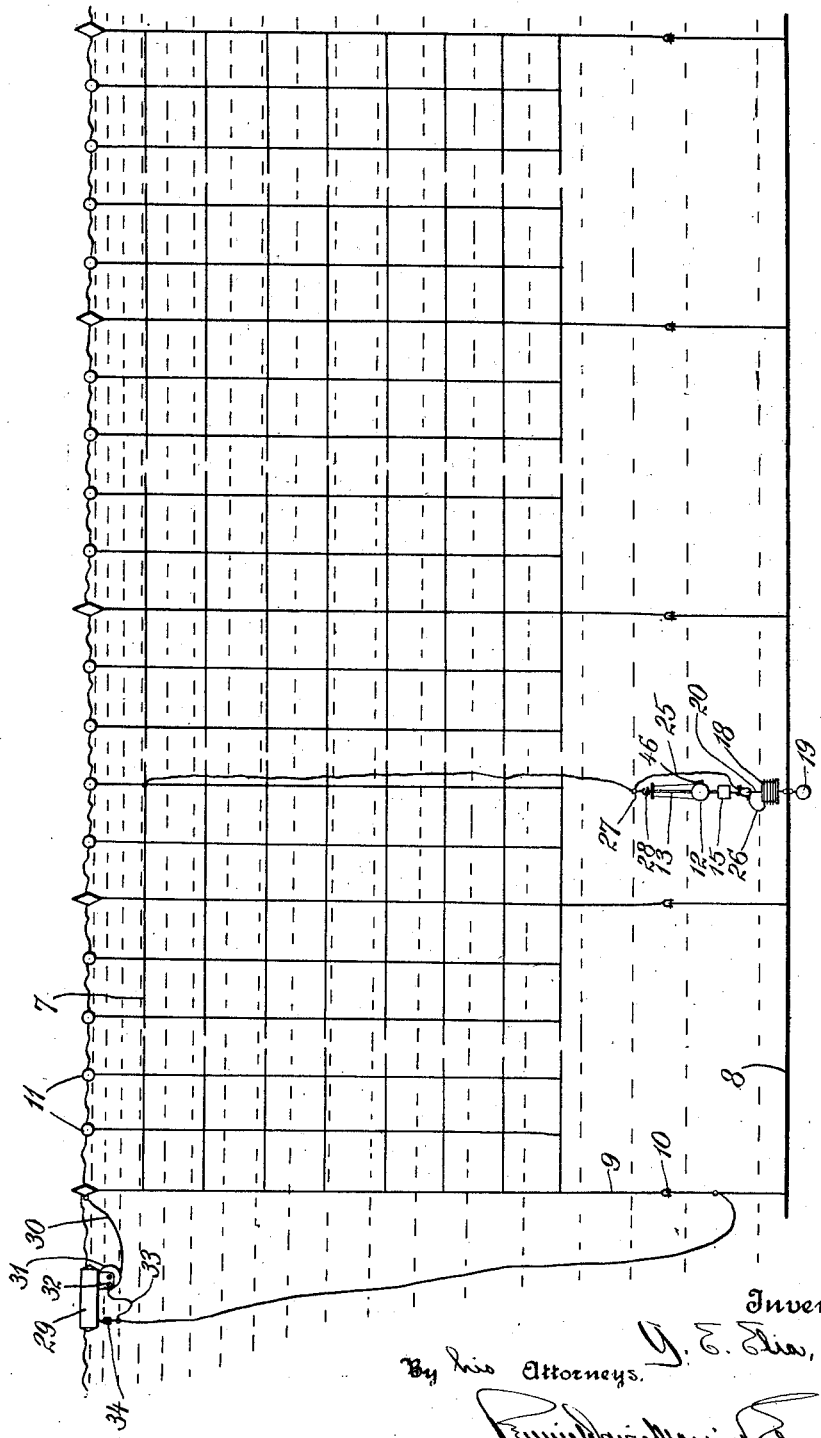

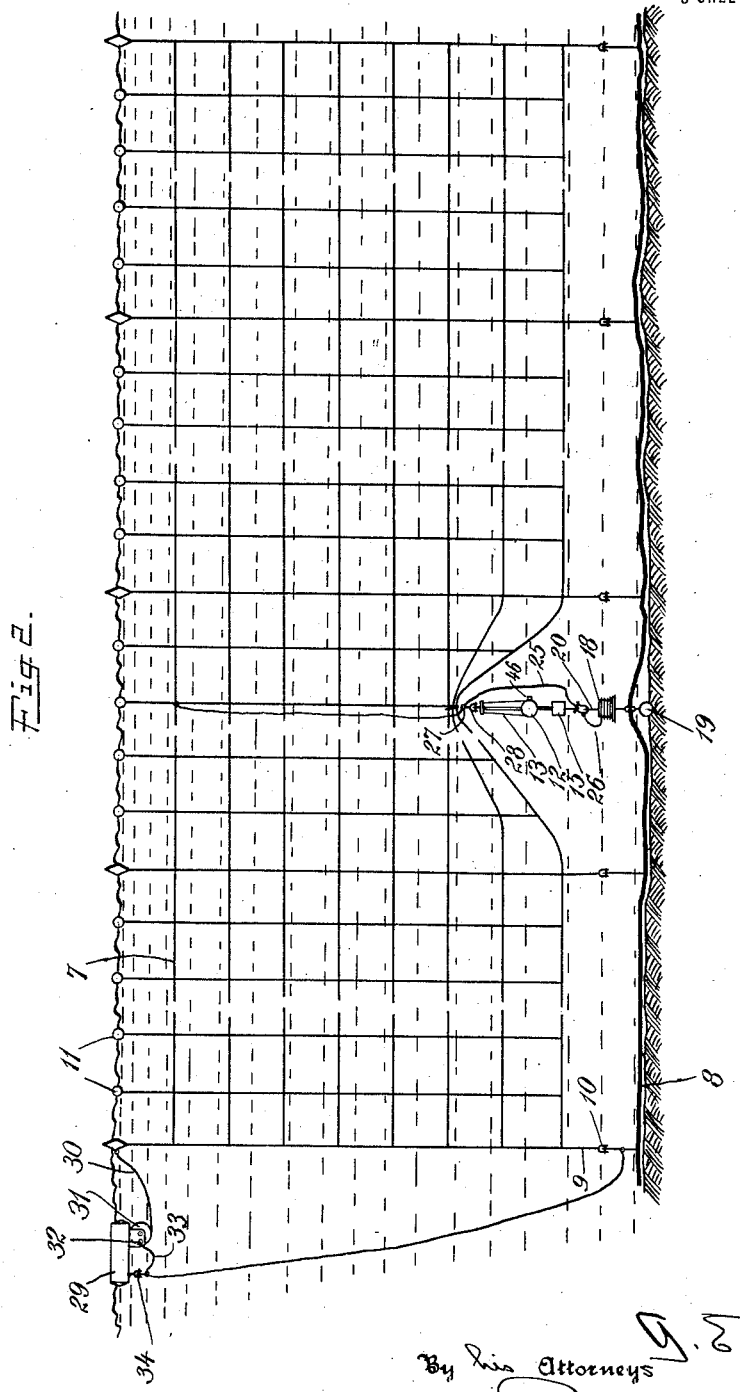

G. E. ELIA.
APPARATUS FOR DETECTING AND INDICATING THE PRESENCE OF SUBMARINE BOATS.
APPLICATION FILED JUNE 26, 1917.
1,430,162.
Patented Sept. 26, 1922.
3 SHEETS—SHEET 3.
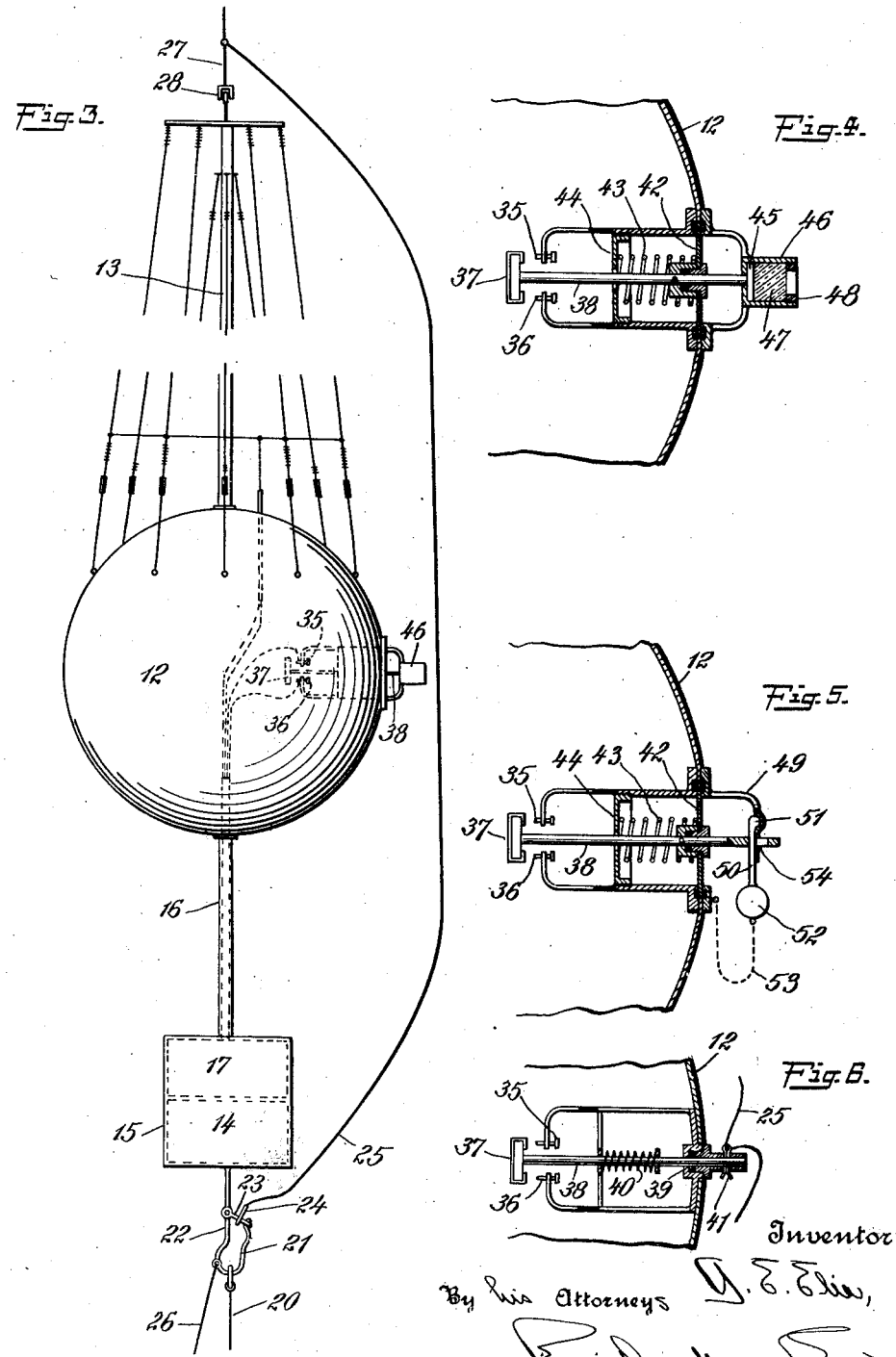

Patented Sept. 26, 1922.

1,430,162

UNITED STATES PATENT OFFICE.

GIOVANNI EMANUELE ELIA, OF NEW YORK, N. Y.

APPARATUS FOR DETECTING AND INDICATING THE PRESENCE OF SUBMARINE BOATS.

Application filed June 26, 1917. Serial No. 177,039.

*To all whom it may concern:*

Be it known that I, GIOVANNI EMANUELE ELIA, a subject of the King of Italy, residing at New York city, in the county of New York, State of New York, have invented certain new and useful Improvements in Apparatus for Detecting and Indicating the Presence of Submarine Boats; and I do hereby declare the following to be a full, clear, and exact description of the invention, such as will enable others skilled in the art to which it appertains to make and use the same.

This invention relates to apparatus for detecting and indicating the presence of submarine boats of the type consisting of a net adapted to be submerged in the sea and a signalling device connected to the net and adapted to be started in operation automatically by movement of the net through the water when the net is engaged and propelled through the water by a submarine boat. More specifically the invention relates to improvements in such a detecting and indicating apparatus of this type as that disclosed in an application for patent filed by me on April 27, 1917, and serially numbered 164,850.

One of the features of the present invention relates to the arrangement of the signalling device, when in its inoperative position, with respect to the net. In the system disclosed in my application above referred to, a net barrier is employed consisting of a plurality of net sections each connected individually to a series cable lying upon the bottom of the sea when the water is comparatively shallow and suspended at a suitable distance below the surface when the water is very deep, there being no connection from any section directly to the sections adjacent to it and the connections from each section to the series cable having shearing pins therein so that when any section is engaged by a submarine boat it may be carried away without displacing the other sections of the barrier. The signalling device connected to each section of such a net barrier is normally held in an inoperative position either by holding it submerged until it is to be used for transmitting signals or by holding it in a horizontal and partially submerged position until it is to transmit signals, whereupon it is turned to an upright position projecting above the surface of the water. When the signalling device is arranged to float upon the surface of the water in an inoperative position, it is possible for a hostile submarine boat to detect it and to render it inoperative either accidentally or intentionally and when it is held submerged a short distance below the surface of the water there is always a danger that it may be struck by a hostile submarine boat and thus disabled. In accordance with the present invention, this danger of injury to the signal apparatus is practically eliminated by holding the signalling apparatus normally submerged at a great depth, a depth greater than that to which submarine boats engaged in hostile naval operations ordinarily submerge. Preferably the signalling device is arranged to be held normally below the lower edge of the net and between the net and the series cable to which the net is connected by the connecting cables having the shearing pins therein. In this position the signalling device may be at a depth of from 100 to 150 feet below the surface of the water and in practice this is adequate to protect the signalling apparatus against injury by accidental engagement of a submarine boat therewith. Furthermore, this arrangement of the signalling apparatus may be employed when the water is of comparatively shallow depth by merely raising the lower edge of the net barrier and attaching it to a portion of the net intermediate the upper and lower edges. Such net barriers may be of a length measured in miles so that though the series cable is suspended a considerable distance above the bottom throughout most of its length, there may be sections where it lies upon bottom. When this occurs and the distance between the lower edge of the net barrier and the series cable is insufficient to provide space for the signalling apparatus, the lower edge of the net may be raised and connected to portions of the net higher up to provide ample space for the signalling apparatus between the net and the series cable.

Another feature of the present invention involves the arrangement of the cables by which connection is made from the net section to the corresponding signalling device. This connection is such as to guard against the cable becoming tangled with some part of the signalling apparatus or wound around the apparatus as a whole by the action of water currents upon the cable and the signalling apparatus. The connection also provides for the automatic release of the signalling apparatus when the net section is carried away so as to insure that it will rise in the intended manner to its operative position upon the surface of the water.

The invention also involves improvements in the arrangement of cable connections to a buoy designed to be carried along with a net section which has been engaged by a submarine boat so as to indicate the position of the net and direct a patrol boat to the net. The automatic signalling apparatus is connected to an anchor and is not carried along with a net section when the latter is engaged by a hostile boat. Instead, it is merely released so that it assumes its operative position and begins to send its signal. To mark the position of the net more closely, a buoy is connected to the net so as to be carried along with it. This buoy carries a reel upon which the cable connection to the net section is wound and if a submarine boat which has engaged a net section descends to a great depth carrying the net section with it, the cable on the reel unwinds so that the buoy may remain on the surface to mark the position of the net. In accordance with the present invention the reel is normally locked against rotational movement and the lock is released when the net is disengaged from the series cable so that the reel may be turned to pay out the cable thereon when necessary.

Another feature of the present invention involves the control of the electric circuit or one of the circuits of the automatic signalling mechanism. This circuit is held open during the time when the signalling apparatus is in its submerged inoperative position and it is closed automatically as an incident to the release of the signalling apparatus and its rise under its own buoyancy to the surface. In the preferred construction of this controller for the electric circuit, a switch in the circuit is arranged to be held normally in the open position by the pressure of the water existing at the depth to which the signalling apparatus is submerged.

These and other features of the invention will be better understood by reference to the following description taken in connection with the accompanying drawings which illustrate the preferred embodiment of the invention. In these drawings, Fig. 1 is a view of a portion of a net barrier showing one net section connected with a series cable submerged at a substantial distance below the surface of the sea but not resting upon bottom; Fig. 2 is a similar view in which the depth of the water is such that the series cable does rest upon bottom; Fig. 3 is a view of the automatic wireless telegraphy signalling apparatus in its submerged condition; and Figs. 4, 5 and 6 are views of automatic switches controlling the circuit or one of the circuits of the wireless telegraph apparatus.

Referring to these drawings, 7 indicates a net section adapted to be submerged in the sea in position to be engaged by a submarine boat. It may be of substantial width so as to extend from the surface of the water down a distance of 75 to 150 feet or more and it may be made of links connected together or cable crossing each other to form a mesh, as indicated in the drawing. In Figs. 1 and 2 but a single section is shown. It will be understood that a complete net barrier would consist of a great number of such sections each of which may be as much as 1,000 feet in length. Adjacent net sections 7 of the barrier are not directly connected together but each section is connected individually to a series cable 8 which may be suspended in the water, as shown in Fig. 1, or may lie upon bottom, as shown in Fig. 2. Each of the connections 9 from the net section to the series cable 8 has a weakened portion therein which preferably consists of a shearing pin 10 of relatively soft metal so that when these connections 9 are subjected to sufficient strain, they break at the shearing pins 10. In this way, any net section 7 which is engaged by a submarine boat may be carried away and detached from the series cable 8 without causing displacement of the other sections of the barrier. A multiplicity of buoys 11 are connected to the upper edge of the net section so as to hold it in a more or less vertical position. The series cable 8 may have buoyant devices connected to it if desired to sustain a portion of its weight or it may be sustained wholly by the net and aid in holding the net vertical.

The automatic signalling apparatus consists of a buoyant casing 12 on which is erected an aerial 13. Current for the operation of the wireless telegraphy apparatus is supplied by a battery 14 (Fig. 3) in a battery box 15 separate from the casing 12 and connected to the bottom of the casing by a water-tight tubular connection 16. The purpose of this arrangement is to utilize the weight of the battery 14 and box 15 to offset the weight of the aerial 13 and thus cause the wireless apparatus to float in an upright position when it is released. The wireless telegraphy apparatus may be located within the casing 12 or within the box 15 as desired. In the present instance it is shown as located at 17 within the box 15 so that its weight as well as that of the battery may be utilized for properly positioning the signalling apparatus as a whole.

The wireless telegraph signal transmitter is normally submerged at a relatively great depth so as to practically eliminate the danger of injury thereto by contact with a submarine boat. For this purpose the signalling apparatus is arranged to be held normally in a position below the lower edge of the net section 7 and above the series cable 8. It is shown in such a position in Fig. 1. For effecting this, a reel 18 is connected to the series cable 8 which is preferably weighted, as shown at 19, at or near the point of connection of the reel to the cable. A link 20 on the reel has an eye on its upper end adapted to receive a hook 21 which is pivotally mounted on the standard 22 depending from the bottom of the battery box 15. A link 23 is pivotally mounted upon the standard 22 and the eye at its end normally receives the end of the pivoted hook 21, as shown in Fig. 3. Before the link 23 is connected with the end of hook 21 it is passed through a ring 24 to which a cable 25 is connected. The reel 18 also has a cable 26 connected thereto and wound thereon and the end of this cable is connected to the standard 22. The cable 25 which is connected to the ring 24 is of considerable length and its upper end is connected to the net section 7 as shown in Figs. 1 and 2. Intermediate its ends the cable 25 is connected to the upper end of the aerial 13, as shown at 27. In this connection 27 from the cable 25 to the aerial 13 is a shearing pin, as indicated at 28 in Fig. 3.

When the parts are arranged as indicated in Figs. 1 and 3, it will be noted that there is a loop in the cable 25 between the points 27 and 24 such that this length of the cable allows of little slack and as both ends of this loop are connected to the automatic signalling apparatus, the danger of the cable becoming entangled with the signalling apparatus or wound around the apparatus by the action of the water on these parts is practically eliminated. This portion of the cable merely remains loosely held in position by its connection to the signalling apparatus at 27 and 24. When the net section 7 is engaged by a submarine boat and carried away thereby, the connections 9 from the net section to the series cable are subjected to strain and when this strain reaches a definite value, the shearing pins 10 in the connections 9 give way so that the net section becomes wholly disconnected from the series cable 8 and from the other net sections which make up the net barrier. As the net section is carried away, the upper portion of the cable 25 is drawn taut until the strain on the shearing pin 28 becomes so great as to cause breakage of that pin and thus free the cable 25 from the upper end of the signalling apparatus. On further movement of the net section through the water, the pull on the cable 25 causes the link 23 to be turned on its pivot so as to disengage the hook 21 and at the same time the ring 24 slides off of the end of the link 23 so that the connection from the net to the signal apparatus is severed completely. When the pivoted hook 21 is thus released by the link 23, it turns on its pivot and slides through the end of the link 20 connecting it to the series cable 8. The entire signalling apparatus is thus released and it rises to the surface under its own buoyancy. As it does so, the cable 26 is unwound from the reel 18 and this cable maintains the connection from the signalling apparatus to the series cable 8, thus preventing the signalling apparatus from moving any substantial distance away from the initial position of the net section.

In order to indicate the position of the net section after it has been carried away by a submarine boat, a buoy 29 is provided connected to the net section 7 by a cable 30. This cable is wound on a reel 31 carried by the buoy 29 and when the net section 7 is carried under water by the boat with which it is engaged, the cable 30 is paid out from the reel 31 to allow the buoy 29 to remain on the surface as an indicator of the position of the net. Normally the reel 31 is prevented from unwinding in order to insure that the buoy 29 will not be carried away from the net section a substantial distance. For this purpose a locking pin 32 is provided for holding the reel 31 against rotation and a cable 33 is connected to the locking pin for withdrawing it to release the reel when the net section is carried away. Adjacent to the locking pin 32 the cable 33 is connected to the buoy 29 through a shearing pin 34. Beyond the shearing pin the cable extends down to one of the cable connections 9 whereby the net section is connected to the series cable 8 at a point below the shearing pin 10 in that connection. When the net section 7 is carried away by a submarine boat, the cable 33 is drawn taut and when it is subjected to sufficient strain, the shearing pin 34 gives way. Thereafter the slight amount of slack in the cable 33 between the shearing pin 34 and the locking pin 32 is taken up and then the locking pin is withdrawn from its normal position in which it obstructs rotational movement of the reel 31. The reel is then free to turn and whenever the net section 7 is carried under, it will turn so as to pay out the cable 30 wound thereon and allow the buoy 29 to remain upon the surface.

The construction shown in Fig. 2 differs from that shown in Fig. 1 only in that the water in which the net section 7 is submerged is of such shallow depth that the series cable 8 rests upon bottom instead of being suspended above bottom as shown in Fig. 1. When this arrangement is employed, it may be that the distance between the lower edge of the net section 7 and the series cable 8 is insufficient to allow the requisite space for the signalling apparatus. Under such circumstances the practice which I prefer to adopt is to raise the lower edge of the net section an amount sufficient to provide the requisite space for the signalling apparatus and to hold this edge of the net section in the raised position by attaching it to lengthwise cables of the net section at the desired distance above the lower edge. This is indicated in Fig. 2 wherein the two lower horizontal cables of the net section are gathered up and attached to the third longitudinal cable. Under such conditions, although the signalling apparatus would not be submerged at so great a depth as that indicated in Fig. 1, still there would be little or no danger of injury to the signalling apparatus by being engaged by a submarine boat as such boats are not intentionally navigated so close to the bottom of the sea.

It is desirable to have the circuits of the wireless telegraph transmitting apparatus or one of those circuits held open normally and to have it close automatically when the transmitting apparatus is released and rises to the surface to transmit its signal. For this purpose an automatic switch apparatus is provided whereby one of the circuits is held open normally and is allowed to close under the proper conditions. In Fig. 3, one of the circuits of the wireless transmitting apparatus is shown as passing through an automatic circuit controller mounted on the casing 12. This circuit controller may be constructed as indicated in Fig. 6, wherein the movable circuit closing member is shown as normally held in the open position by a pin which is connected to the cable 25 and is removed thereby. In Fig. 6, the circuit which is under the control of this controlling device passes through contacts 35 and 36, which are adapted to be connected by a bridging contact 37. This contact 37 is carried by a rod 38 passing through a stuffing box 39 on the casing 12. A spring 40 acts upon the rod 38 in a direction to move the contact 37 into engagement with the contacts 35 and 36. The rod 38 and contact 37 are normally held in the positions in which they are shown in Fig. 6 by a pin 41 passing through openings in the rod 38 and the boss on casing 12 through which it extends, and this pin 41 is connected to the cable 25. When the slack in cable 25 is taken up by the movement of the net section through the water, the cable is first disconnected from the upper end of the aerial at the shearing pin 28, then the pin 41 is withdrawn and thereafter the link 23 is operated. When pin 41 is withdrawn, the spring 40 moves rod 38 to carry the contact 37 into engagement with contacts 35 and 36, thereby closing a controlling circuit of the wireless transmitting apparatus and allowing that apparatus to operate.

I prefer, however, to operate the circuit controlling apparatus independently of the cable 25 and two mechanisms by which this may be accomplished are shown in Figs. 4 and 5. In those figures, contacts 35 and 36 are shown adapted to be connected by a bridging contact 37 which is carried by the rod 38. In Fig. 4, this rod 38 is shown as connected to a flexible diaphragm 42 set in an opening in the casing 12, its exterior surface being exposed to the sea. A spring 43 is arranged between the diaphragm 42 and a spider 44 secured to the frame of the controller, this spring being arranged to act upon the diaphragm 42 in a direction to move it and the rod 38 to carry the contact 37 into engagement with contacts 35 and 36. On the outer end of rod 38 is a piston 45 movable within a cylinder 46 open at its outer end. Within this cylinder is a block 47 of a soluble substance such as salammoniac held in position by a washer 48. When the apparatus is to be launched, the parts are in the positions in which they are shown in Fig. 4. When the apparatus is put overboard and sinks to its normal condition, as shown in Fig. 1, the sea water enters through the washer 48 and dissolves the soluble material 47. Before this material is dissolved, however, the apparatus has sunk to its normal depth, as indicated in Fig. 1, at which depth the diaphragm 42 is subjected to a substantial pressure. Therefore, when the block 47 is entirely dissolved, the rod 38 will still be held in the position in which it is shown by the pressure on the outer surface of the diaphragm 42, notwithstanding the fact that the spring 43 tends to move the rod 38 and diaphragm 42 to the position in which the contact 37 bridges contacts 35 and 36. However, when the net section is carried away and the signalling apparatus rises to the surface, as above described, the pressure on the diaphragm 42 will decrease as the signalling apparatus rises and as it decreases the spring 43 will move rod 38 until finally the contacts 35 and 36 are electrically connected by the contact 37.

Instead of the construction shown in Fig. 4, I may employ such a construction as that shown in Fig. 5, wherein the use of a soluble block 47 is avoided. In the Fig. 5 construction, the parts 35, 36, 37, 38, 42, 43 and 44 are similar to those shown in Fig. 4 except that at the outer end of the rod 38 there is no piston. Instead, this end of rod 38 is slotted and passes through an opening in an arm 49 projecting outwardly from the casing 12. A pin 50 extends through the slot in the rod 38 and an enlarged head 51 on the end of the pin normally rests in a cup or depression provided for its reception in the arm 49. The lower end of pin 50 may be weighted, as shown at 52, and may be connected by a chain 53 to the casing 12. When the signalling apparatus is prepared for launching, the parts of the signal controller are assembled as shown in Fig. 5. The spring 43 then forces rod 38 outwardly and the end of the slot 54 engages the pin 50, pressing the pin against the arm 49 and the pin is held in position by its enlarged head 51 entering the depression in arm 49. In this condition of the parts the circuit is open by reason of the separation of the contact 37 from the contacts 35 and 36. When the signalling apparatus is put overboard and sinks to the appropriate depth, the pressure on the diaphragm 42 increases until it overcomes the tension of spring 43 and finally moves the rod 38 to the left in Fig. 5. After the rod 38 has been moved thus a short distance, the pin 50 is released and is withdrawn from the depression in arm 49 and the slot in rod 38 by the weight 52. The switch contacts continue to be held open. After the net section has been engaged by a submarine boat and carried away, as above described, the signalling apparatus rises to the surface and as it does so the hydrostatic pressure on the diaphragm 42 decreases, thus allowing the spring 43 to move rod 38 to the right until finally when the signalling apparatus reaches the surface, the contact 37 engages the contacts 35 and 36 and puts the wireless telegraph signalling apparatus in operative condition.

I claim:

1. Apparatus for detecting and indicating the presence of submarine boats comprising the combination of a plurality of net sections adapted to be submerged in the sea to constitute a net barrier, a series cable submerged in the sea below the net sections, independent connections from each net section to the series cable each having a weakened portion therein, a plurality of buoyant automatic signalling devices, one for each net section, each connected to the series cable so as to lie between that cable and the lower edge of the overlying net section and intermediate the ends of that net section and means operated automatically when any net section is engaged and carried away by a submarine boat for releasing the corresponding buoyant automatic signalling device to permit that device to rise to the surface and transmit its signal; substantially as described.

2. Apparatus for detecting and indicating the presence of submarine boats comprising a plurality of net sections adapted to be submerged in the sea to constitute a net barrier, a series cable to which each of the net sections is connected independently of the others, a plurality of buoyant automatic signal transmitters, one for each net section, each connected to the series cable and lying between the same and the lower edge of the corresponding net section and intermediate the ends of that net section the net section having the portion at the lower edge thereof gathered up and secured to the overlying portion of the net section to afford space for the signalling device, and means operated automatically when the net section is engaged and carried away by a submarine boat for automatically releasing the signalling device to permit the same to rise to the surface and transmit its signal; substantially as described.

3. Apparatus for detecting and indicating the presence of submarine boats comprising the combination of a net adapted to be submerged in the sea in position to be engaged by a submarine boat, a buoyant automatic signalling device, means for holding the signalling device normally submerged, releasing means at the lower end of the signalling device operable to release the signalling device and permit the same to rise to the surface, a cable extending from the net to said releasing means and a connection from said cable to the upper end of the signalling device which connection is weakened so that it will be broken when the net is engaged and carried away by a submarine boat; substantially as described.

In testimony whereof I affix my signature.

GIOVANNI EMANUELE ELIA.